United States Patent [19]

Kitamura

[11] Patent Number: 5,779,369

[45] Date of Patent: Jul. 14, 1998

[54] PRELOAD CONTROL APPARATUS FOR BEARINGS

[75] Inventor: Koichiro Kitamura, Takaoka, Japan

[73] Assignee: Kitamura Machinery Co., Ltd., Japan

[21] Appl. No.: 605,596

[22] Filed: Feb. 22, 1996

[51] Int. Cl.[6] ............................................. F16C 23/00
[52] U.S. Cl. ................................... 384/517; 384/563
[58] Field of Search ................................ 384/518, 563, 384/517, 519

[56] References Cited

U.S. PATENT DOCUMENTS 4,227,755  10/1980  Lundberg ......................... 384/518
4,672,250   6/1987  Seitz ........................... 384/518 X
5,094,551   3/1992  Kitamura et al. .................... 384/518

Primary Examiner—Thomas R. Hannon
Attorney, Agent, or Firm—Lorusso & Loud

[57] ABSTRACT

A preload control apparatus comprising a bearing 16–19 and at least one coned disc spring 26 for exerting a preload on the bearing, one or some or all of the coned disc spring(s) being at least partly made of a shape memory alloy so that the preload on the bearing can be adjusted with changes in temperature of the coned disc spring(s).

8 Claims, 5 Drawing Sheets

PRELOAD CONTROL APPARATUS FOR BEARINGS

BACKGROUND OF THE INVENTION

This invention relates to a preload control apparatus for bearings which is suitable for a spindle of a machine tool.

In recent years, it is desired to operate a machine tool at a high speed. In such a high speed machining where a spindle rotates at more than 15,000 or 20,000 r.p.m., bearings are extremely heated. The bearings and their related members expand with heat so that a preload on the bearings becomes large. As a result, the bearings are sometimes broken or become seized.

On the other hand, if the spindle rotates at a low speed, a heavy machining operation is usually required. In such a case, a large preload on the bearing is necessary.

Preload control apparatuses have been proposed, which adjust a preload for bearings in plural stages. The conventional preload control apparatuses include piezo electric sensors or hydraulic systems for the preload control purposes.

However, the conventional preload control apparatuses have a large and complicated construction. The production and maintenance costs are relatively high.

SUMMARY OF THE INVENTION

The object of this invention is to provide a preload control apparatus for bearings which has a simple construction and can be manufactured at a low cost with easy maintenance.

According to this invention, a preload control apparatus includes at least one coned disc spring for exerting a preload on the bearing, wherein one or some or all of the coned disc springs is, are at least partly made of a shape memory alloy so that the preload on the bearing can be adjusted with changes in temperature of the coned disc spring(s).

According to one preferred embodiment, one coned disc spring is provided for preloading on the bearing, which has a large diameter and is made of a shape memory alloy so that the preload on the bearing can be adjusted with changes in temperature of the coned disc spring.

According to another preferred embodiment, a plurality of coned disc springs having small diameter are provided for preloading on the bearing, wherein some or all of the coned disc springs is or are at least partly made of shape memory alloy so that the preload on the bearing can be adjusted with changes in temperature of the coned disc springs.

According to the other preferred embodiment, a plurality of coned disc springs having small diameter are provided for preloading on the bearing, wherein some or all of the coned disc springs are at least partly made of shape memory metals having shape memory effects different from each other so that the preload on the bearing can be adjusted with changes in temperature of the coned disc springs.

Preferably, a set of coned disc springs have shape memory effects different from each other at various temperatures so that the preload on the bearing can be automatically adjusted in multiple stages.

Examples of the shape memory alloy are Ti—Ni, Au—Cd, Cu—Au—Zn, In—Tl, In—Cd, Ti—Ni—Cu, Cu—Zn—Al and Cu—Al—Ni.

In the preload control apparatus of this invention, if the bearing is heated, the heat is transmitted to the coned disc springs. When the coned disc springs are heated to a predetermined temperature, they are deformed due to their shape memory effect such that the preload on the bearing decreases.

If a plurality of coned disc springs have shape memory effects different from each other, then the preload on the bearing decreases at multi-stages.

Thus, a preload control apparatus according to this invention can be constructed in a simple manner at a low cost in comparison with the prior art. It is possible to adjust automatically a preload on the bearing in a reliable manner.

If some or all of the coned disc springs are made of shape memory metals having shape memory effects different from each other and the coned disc springs are thermally connected to the bearing, the preload on the bearing can be adjusted in a reliable manner with changes in temperature of the bearing.

DESCRIPTION OF THE EMBODIMENT

Preferred embodiments will be explained with reference to the drawings.

FIRST EMBODIMENT

Figure 1:
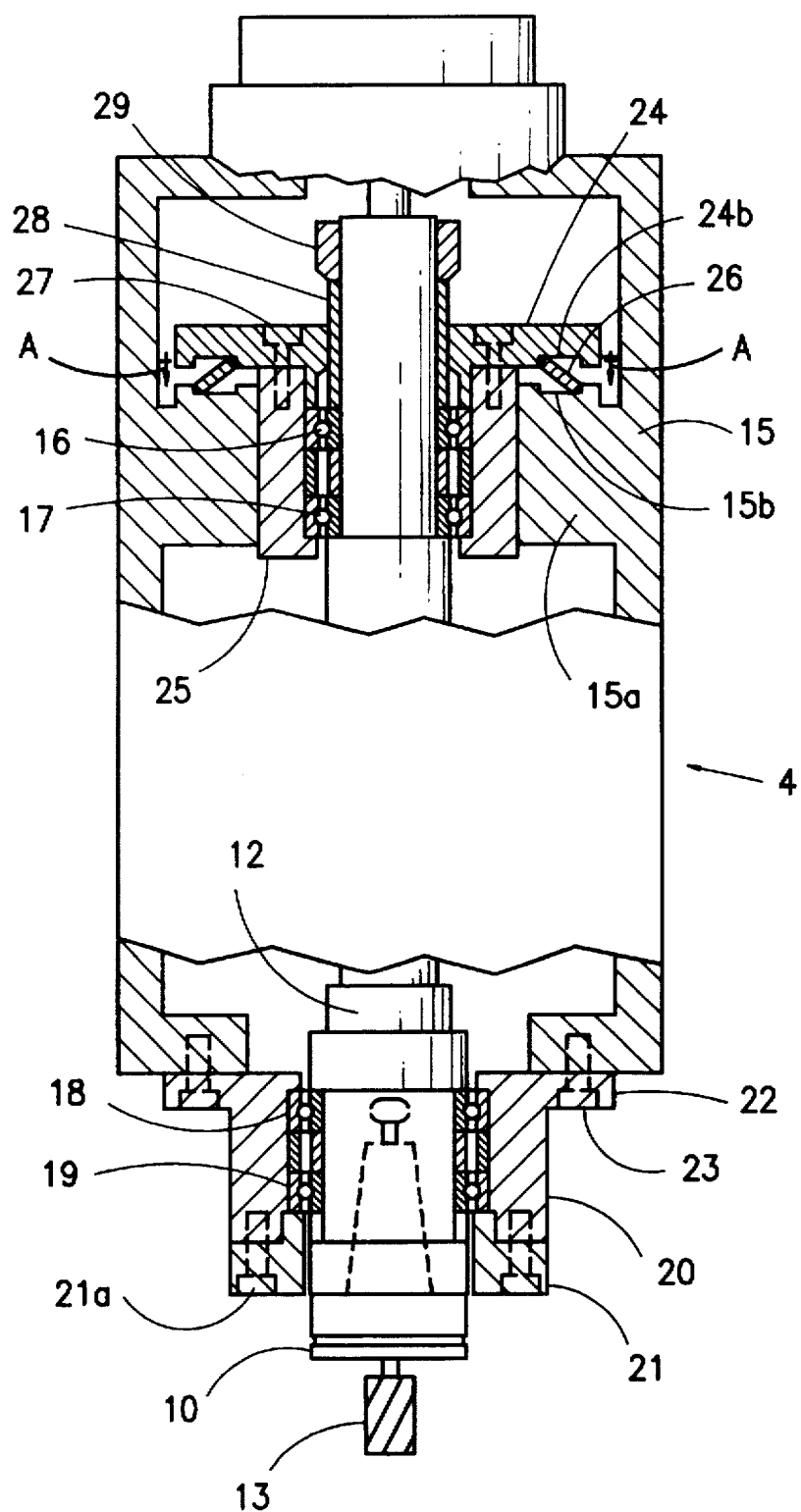
FIG. 1 is a sectional view showing a main portion of a spindle head equipped with a first embodiment of the preload control apparatus for bearings according to this invention.
Figure 2:
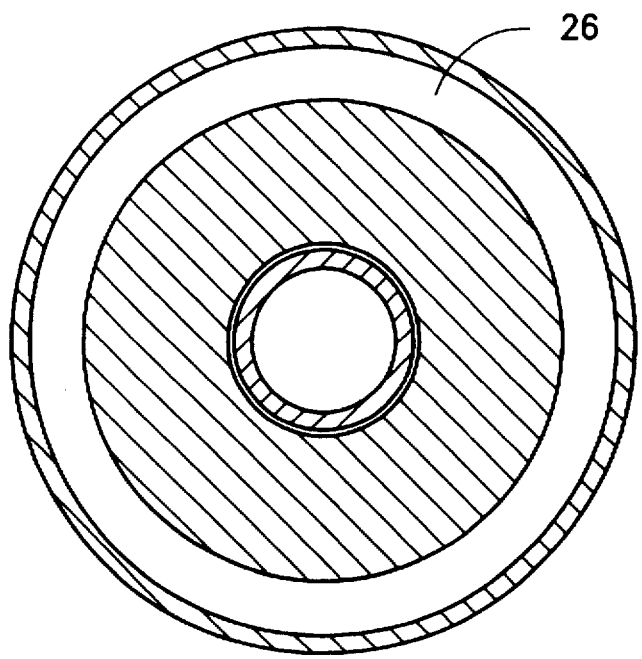
FIG. 2 is a sectional view taken along the line A—A in FIG. 1.
Figure 3:
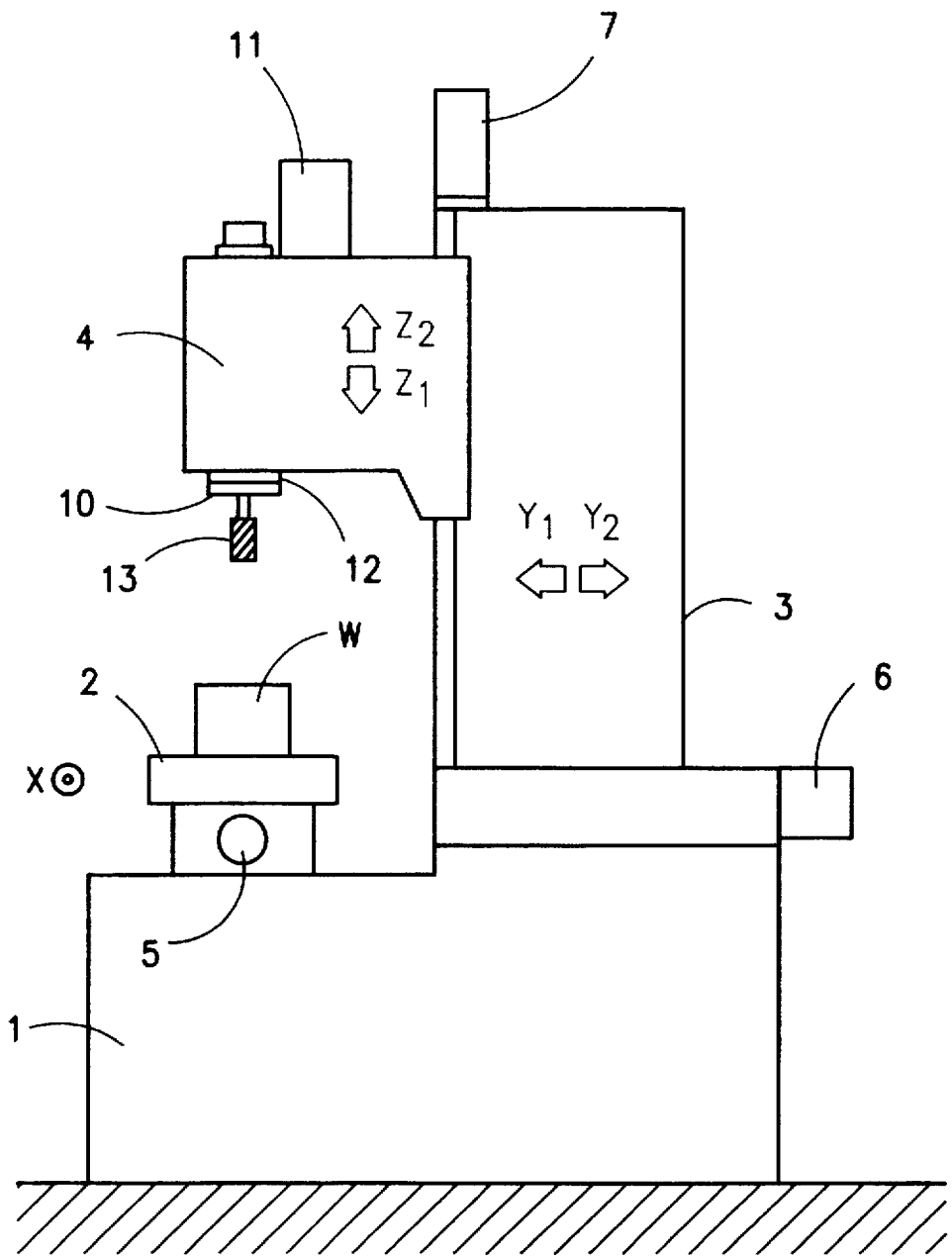
FIG. 3 is a side view showing the machine tool having the spindle head of FIG. 1.

Referring to FIG. 1 to FIG. 3, a first embodiment of a preload control apparatus according to this invention will be explained. FIG. 3 shows a machine tool equipped with a preload control apparatus for bearings.

The machine tool includes a bed 1, a table 2, a column 3, a spindle head 4 and motors 5, 6, 7, 11.

A workpiece W is set on the table 2. The table 2 can move by means of the motor 5 in directions X. The column 3 can move in directions Y1, Y2 by means of the motor 6. The spindle head 4 can move in directions Z1, Z2 by means of the motor 7.

A tool holder 10 is detachably attached to a spindle 12 in the spindle head 4. A tool 13 held by the tool holder 10 rotates by means of the motor 11.

FIG. 1 shows a portion of the spindle head 4. Referring to FIG. 1, the spindle 12 is rotatably supported by a frame 15 via first to fourth bearings 16, 17, 18, 19.

A flange 22 of a first member 20 is fixed on the frame 15 by means of bolts 23. A second member 21 is fixed to a lower end of the first member 20 by means of bolts 21a. The third to fourth bearings 18, 19 are arranged between the first member 20 and the spindle 12 so that the spindle 12 can rotate.

The frame 15 has an inner flange 15a in the middle thereof, and inside the flange 15a a third member 25 is arranged. A fourth member 24 is fixed on the upper end of the third member 25 by means of bolts 27. The fourth member 24 has a first recess 24b for receiving a coned disc spring. The flange 15a has a second recess 15b corresponding in position to the recess 15b.

Between the first recess 24b and the second recess 15b a coned disc spring 26 is arranged, which has relatively a large diameter (FIG. 2). The coned disc spring 26 is made of a shape memory alloy.

As is well known, a shape memory alloy has such a property that a metallic object of a given shape is cooled from a high temperature to the room temperature where it is deformed so as to change its shape, and upon reheating to a high temperature the shape change accomplished in cooling room temperature is reversed so that the object returns to its original configuration. This thermoelastic property of the shape memory alloys is associated with the fact that they undergo a martensitic phase transformation, such as Ti—Ni, Cu—Zn—Al, Cu—Al—Ni.

The first and second bearings 16, 17 are arranged between the third member 25 and the spindle 12 so that the spindle can rotate. A tubular fifth member 28 is placed on the inner rings of the first and second bearings 16, 17. On the upper end of the fifth member 28 is arranged a press member 29. The presser member 29 has a thread portion which engages a counter thread portion of the spindle 12.

The coned disc spring 26 lifts upwardly the fourth member 24 and, consequently, the fifth member 25 so that the first and second bearings 16, 17 are in a preload condition. According to the temperature of the coned disc spring 26 the preload condition changes in multiple stages.

The coned disc spring 26 is formed from a spring plate into a bottomless dish-shape (or a topless cone-shape). The coned disc spring 26 is harder to deform in the lateral direction than a coil spring whereas it is deformable in a vertical loading direction. Therefore the preload becomes reliable.

The coned disc spring 26 has, for example, a shape memory whereby it works as spring below 40 degrees Celsius, whereas it deforms so as a not to work as spring or play at 40 degrees Celsius or more.

It is desirable that the coned disc spring 26 and the first-second bearings 16, 17 be thermally connected with each other. In such a case, the preload on the first-second bearings 16, 17 can be controlled in accordance with the temperature of the bearings.

If the temperature of the first-second bearings 16, 17 rises and, consequently, the temperature of the coned disc spring 26 rises via said thermal connection, said preload mechanism provided with the coned disc spring 26 made of shape memory alloys acts in the following manner. At a temperature less than 40 degrees Celsius, the coned disc spring 26 works as spring so as to exert a maximum preload of, for example, 132 kg. Whereas at a temperature of 40 degrees Celsius or more, the spring 26 deforms and plays so as to exert a minimum preload of 20 kg.

The coned disc spring 26 is arranged concentric with the spindle 12.

SECOND EMBODIMENT

Figure 4:
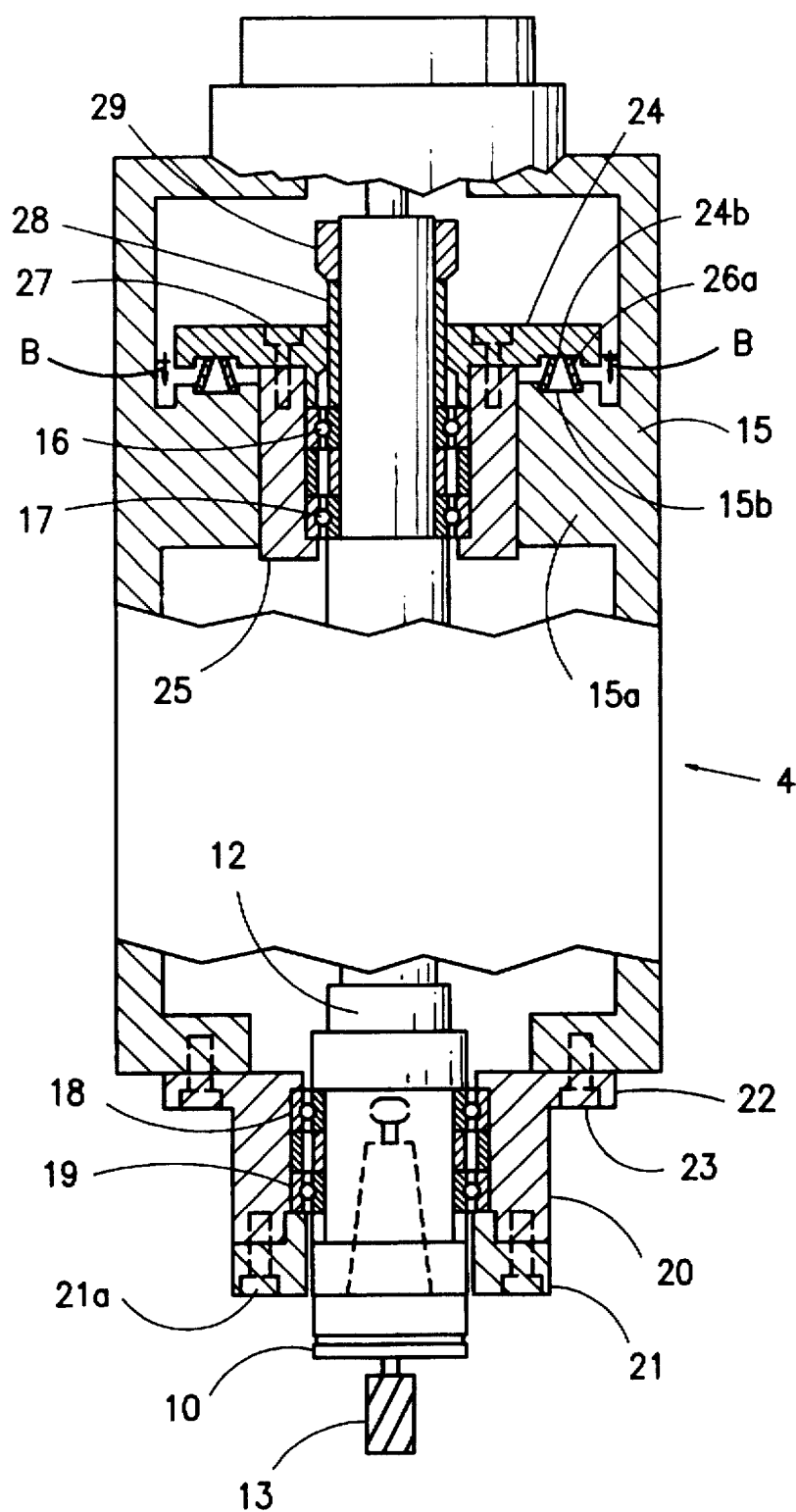
FIG. 4 is a sectional view showing a main portion of a spindle head equipped with a second embodiment of the preload control apparatus for bearings according to this invention.
Figure 5:
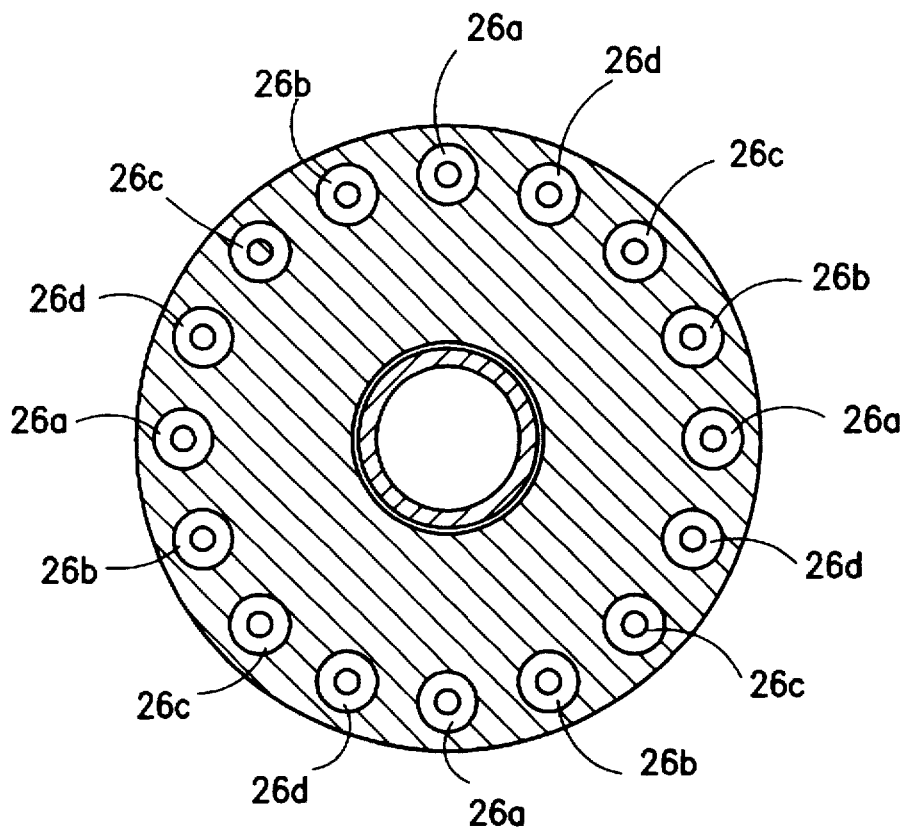
FIG. 5 is a sectional view taken along the line B—B in FIG. 4.

Referring to FIG. 3 to FIG. 5, a second embodiment of the preload control apparatus for bearings according to the invention will be explained. FIG. 3 shows a machine tool equipped with the second embodiment of the preload control apparatus for bearings. In the drawings, the corresponding members are designated by the same numerals as in the first embodiment.

The machine tool includes a bed 1, a table 2, column 3, spindle head 4 and motors 5, 6, 7, 11.

A tool holder 10 is detachably attached to a spindle 12 in the spindle head 4. A tool 13 held by the tool holder 10 rotates by means of the motor 11.

Referring to FIG. 4, a spindle head 4 is partially shown. The spindle 12 is rotatably supported via first to fourth bearings 16, 17, 18, 19 in a frame.

A flange 20 of a first member is fixed on the frame 15 by means of bolts 23. At the bottom end of the first member 20 a second member 21 is fixed by means of bolts 21a. A third and fourth bearings are located between the first member 20 and the spindle 12 so that the spindle can rotate.

The frame 15 has a flange 15a at the middle thereof, and a third member 25 is placed in the flange 15a. A fourth member 24 is fixed on the upper end of the third member 25 by means of bolts 27. The fourth member 24 has a plurality of first recesses 24b for receiving small coned disc springs 26a–26d. The flange 15a has a plurality of second recesses 15b corresponding in position to the first recesses 24b. In the illustrated embodiment 16 sets of first and second recesses 24b, 15b are provided.

Four sets of small coned disc springs 26a–26d are arranged between the first recesses 24b and the second recesses 15b (shown in FIG. 5). The first to fourth coned disc springs 26a–26d are located on a circle around the spindle.

The first to fourth coned disc springs 26a–26d are each four in number in the illustrated embodiment, consequently 16 in total.

The first to third coned disc springs 26a–26c are made of a shape memory alloy. The fourth coned disc springs 26d are ordinary coned disc springs.

As well known, shape memory alloy has such a property that as a metallic object of a given shape is cooled from a high temperature to room temperature where it deforms so as to change its shape, and upon reheating to a high temperature the shape change accomplished in cooling to room temperature is reversed so that the object returns to its original configuration. This thermoelastic property of the shape memory alloys is associated with the fact that they undergo a martensitic phase transformation, such as Ti—Ni, Cu—Zn—Al, Cu—Al—Ni.

First to second bearings 16, 17 are arranged between the third member and the spindle so that the spindle can rotate. A tubular fifth member 28 is arranged on the upper end of the inner ring of the first and second bearings 16, 17. On the upper end of the fifth member 28 is arranged a press member 29 having a thread portion which engages a counter thread portion of the spindle 12.

The first to fourth sets of coned disc springs 26a–26d elastically press the fourth member 24 and the third member 25 upwardly so that the the first and second bearings 16, 17 are in a preload condition. In accordance with temperature of the first to fourth sets of coned disc springs the preload is adjusted in multiple stages.

The first to fourth sets of coned disc springs 26a–26d are formed, respectively, from a spring plate into a bottomless dish-shape (or a topless cone-shape). The coned disc spring 26 is harder to deform in the lateral direction than a coil spring whereas it is deformable in a vertical loading direction. Therefore the preload becomes reliable.

The first to fourth sets of coned disc springs 26a–26d have different properties of shape memory effect as follows. For example, the first to third sets of coned disc springs 26a, 26b, 26c act as springs below 25 degrees Celsius (or room temperature), below 30 degrees Celsius, below 40 degrees Celsius, respectively, whereas they deform so as not to work with spring or play at 25 degrees Celsius (or room temperature) or more, at 30 degrees Celsius or more, at 40 degrees Celsius or more, respectively.

It is desirable that the first to fourth sets of coned disc springs and the first and second bearings be thermally connected so that the preload on the first and second bearings can be adjusted in accordance with temperature thereof.

When the first and second bearings and, consequently, the first to fourth sets of coned disc springs are heated via said thermal connection and the temperatures of the springs increase, first to third sets of coned disc springs made of memory shape alloy of the preload system operate as follows. For instance, the maximum preload of 132 kg is on the bearings below 25 degrees Celsius by means of the the first to fourth sets of coned disc springs 25a–25d. Between 25 degrees Celsius and 30 degrees Celsius the first set of coned disc springs deform so as to play and the middle preload of, for instance, 84 kg is on the bearings by means of the second to fourth sets of coned disc springs 26b–26d. Between 30 degrees Celsius and 40 degrees Celsius the first and second sets of coned disc springs 26a, 26b deform so as to play, and another middle preload of, for instance, 50 kg is imposed on the bearings by means of the third and fourth coned disc springs. At 40 degrees Celsius or more the first to third sets of coned disc springs 26a–27c deform so as to play and the minimum preload of, for instance, 20 kg is imposed on the bearings.

The preload changes in multiple stages as described before, so that it is suitably adjusted in accordance with the temperature of the bearing.

This invention is not limited to be above-described embodiments only. For example, the number and arrangement of the coned disc springs may be optionally selected.

The bearings can be used in combination of any other types.

Although in the illustrated embodiment the coned disc springs deform so with not to work as spring or play at or above the predetermined temperatures they can be designed, on the contrary, to deform so as to work as springs in order to decrease the preload on the bearing. In this case some of the coned disc springs do not work with spring or play at low temperature (below the predetermined temperature). This invention can be applied not only to bearings for supporting the spindle in the machine tool but to any other bearings.

And the shape of coned disc springs are not restricted to the above-described shape, but can be modified in other shapes.

I claim:

1. A machine tool comprising:

a bed, a table for supporting a workpiece and mounted on said bed for movement relative thereto, a column extending vertically from said bed, a spindle head movably supported by said column for vertical movement, a spindle mounted within said spindle head and extending vertically toward said table, and a tool holder detachably supported by said spindle for holding a tool, wherein said spindle head comprises:

a frame defining an interior space within said spindle head;

a plurality of bearings for rotatably supporting said spindle within said spindle head for rotation relative to said frame, an inner flange extending horizontally from said frame into the interior space and defining a central opening;

pressing means for pressing said spindle vertically downward relative to said frame so as to exert a preload on said bearings;

an intermediate member mounted within said frame for vertical sliding movement relative thereto, at least one of said bearings being interposed between said intermediate member and said spindle, a plurality of coned disc springs surrounding said spindle, each of said coned disc springs being formed from a spring plate into a topless cone-shape and having an upper end supporting said intermediate member and a lower end supported by said inner flange, said coned disc springs including a first set of springs made of a shape memory alloy and, in cooperation with said pressing means, regulating the preload exerted on the bearings in multiple stages responsive to changes in temperature.

2. A machine tool as defined in claim 1, wherein said inner flange has a plurality of first circular recesses arranged around an upper surface thereof and spaced at regular intervals, each of said first circular recesses receiving a lower end of a respective one of said coned disc springs and wherein said intermediate member includes:

a circular plate having a central through-hole and a plurality of second circular recesses arranged on a lower surface thereof surrounding said central through-hole and spaced at regular intervals corresponding in position to said first circular recesses of the inner flange, each of said second circular recesses receiving an upper end of a respective one of said coned disc springs, and a sleeve member surrounding said spindle and extending vertically through said central opening of said inner flange member between at least one of said bearings and said inner flange of said frame.

3. A machine tool as defined in claim 2, wherein said first set of said coned disc springs exert a spring force on said bearings below a deformation temperature and deform above said deformation temperature so as not to exert a spring force on said bearings.

4. A machine tool as defined in claim 3 wherein said plurality of said coned disc springs further includes a second set of springs lacking said shape memory.

5. A machine tool as defined in claim 4 wherein the springs of said first set alternate with the springs of said second set in a circular arrangement.

6. A machine tool as defined in claim 4 wherein said plurality of cone disc springs further includes a third set of springs having a shape memory and having a deformation temperature different from the deformation temperature of said first set of springs, the springs of said first, second and third sets being arranged in an alternating sequence in a circle.

7. A machine tool as defined in claim 2, wherein said coned disc springs and at least one of said bearings are thermally connected to each other via said intermediate member.

8. A machine tool as defined in claim 2, wherein said coned disc springs are arranged at regular intervals in a circle around said spindle.

* * * * *